United States Patent [19]
Adler et al.

[11] Patent Number: 5,367,561
[45] Date of Patent: Nov. 22, 1994

[54] CASH ACCESS SYSTEM AND METHOD OF OPERATION

[75] Inventors: B. Michael Adler; John A. Hird, both of Dallas; Lindsey D. Owen, Carrollton, all of Tex.

[73] Assignee: First City Texas-Dallas, Dallas, Tex.

[21] Appl. No.: 832,978

[22] Filed: Feb. 10, 1992

[51] Int. Cl.⁵ .......................................... H04M 11/00
[52] U.S. Cl. ........................................ 379/93; 379/91; 379/97; 364/405; 364/408
[58] Field of Search ........................ 379/91, 93, 95, 96, 379/97, 98, 102, 104, 105; 364/405, 408, 401; 235/379, 380, 382; 340/286.08

[56] References Cited

U.S. PATENT DOCUMENTS

| | | | |
|---|---|---|---|
| 4,187,498 | 2/1980 | Creekmore | 379/91 |
| 4,553,222 | 11/1985 | Karland et al. | 364/401 |
| 4,626,627 | 12/1986 | van Gilluwe et al. | 379/214 |
| 4,630,200 | 12/1986 | Ohmae et al. | 379/91 |
| 4,650,978 | 3/1987 | Hudson et al. | 235/380 |
| 4,672,377 | 6/1987 | Murphy et al. | 379/91 |
| 4,677,661 | 6/1987 | van Gilluwe et al. | 379/159 |
| 4,939,352 | 7/1990 | Sunyich | 235/382 |
| 4,996,705 | 2/1991 | Entenmann et al. | 379/91 |
| 5,016,270 | 5/1991 | Katz | 379/97 |
| 5,077,607 | 12/1991 | Johnson et al. | 358/86 |

Primary Examiner—Curtis Kuntz
Assistant Examiner—Stella L. Woo
Attorney, Agent, or Firm—Baker & Botts

[57] ABSTRACT

A cash access system is provided for disbursing funds to consumers, such as the guest of a hotel, according to instructions of the consumer. The system comprises circuitry for receiving instructions associated with the request from a selected one of a plurality of input terminals, for validating the request with the relevant authority, for instructing the management associated with the input terminals to disburse the funds to the consumer and for billing the consumer for the withdrawal.

4 Claims, 6 Drawing Sheets

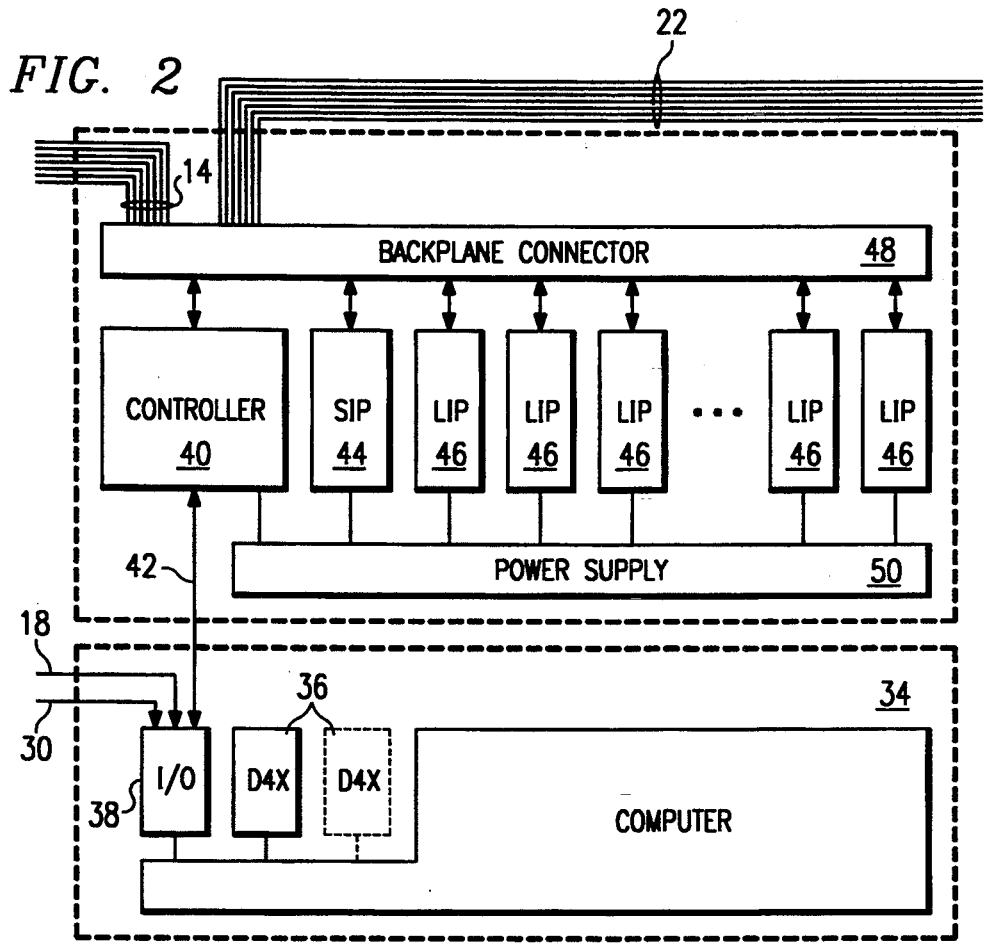
FIG. 2
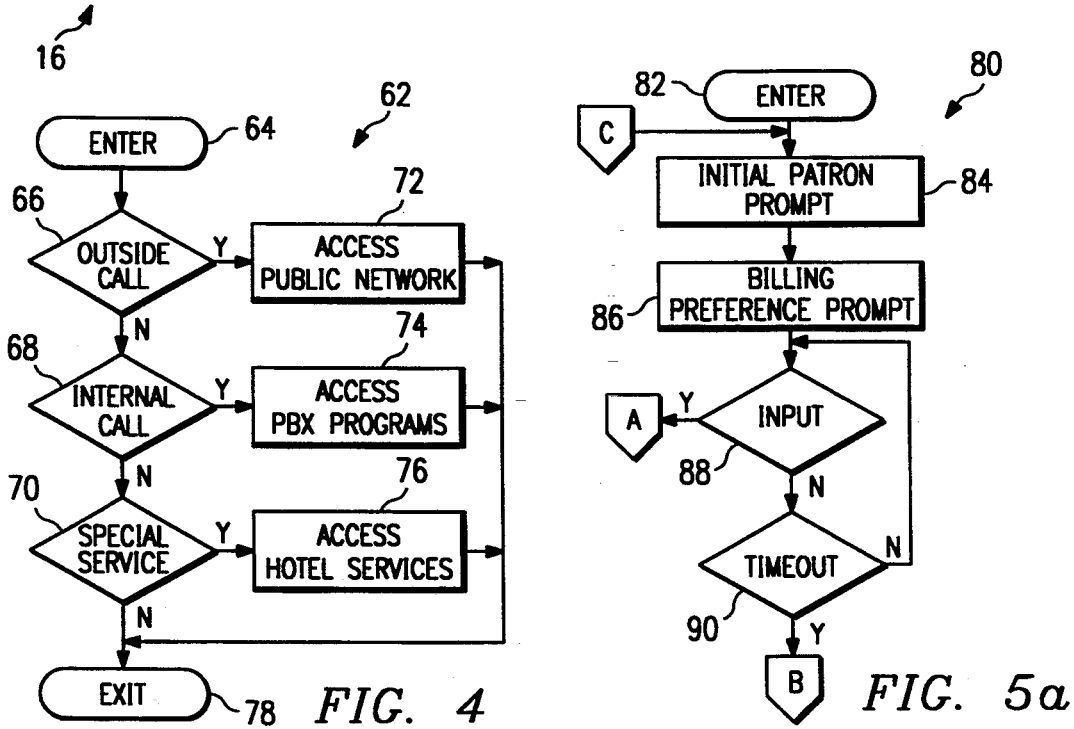
FIG. 4
FIG. 5a

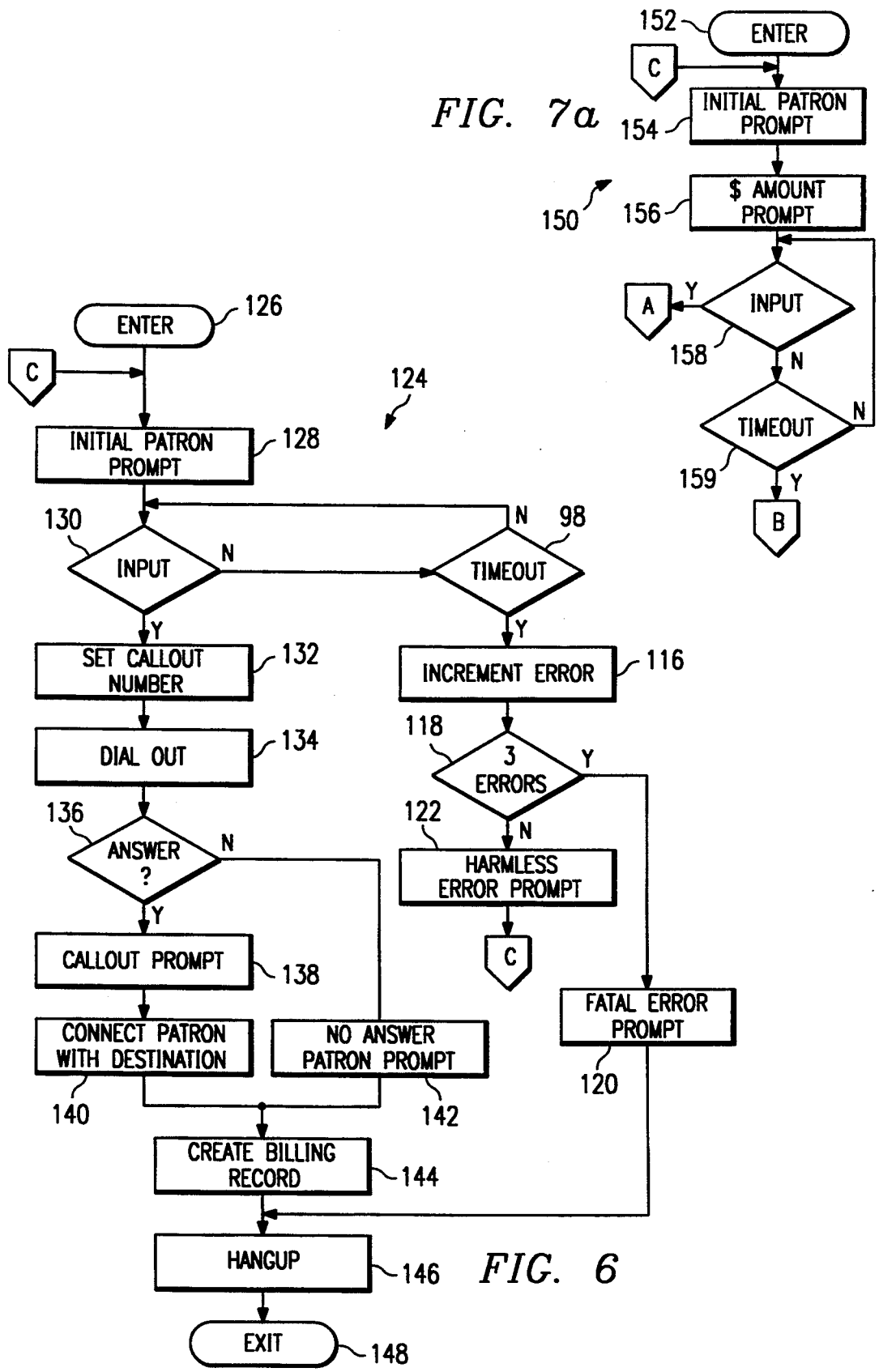

CASH ACCESS SYSTEM AND METHOD OF OPERATION

TECHNICAL FIELD OF THE INVENTION

This invention relates in general to the field of telecommunications and, more particularly, to a system and method for disbursing cash to a consumer such as a hotel guest.

BACKGROUND OF THE INVENTION

Consumers now expect to have access to many goods and services independent of the location of the consumer. Consumers demand access of such goods and services as commercial information databases, telemarketing services, and electronic banking services. Consumers that travel are particularly in need of such services since they are not able to carry all of their own resources with them when they travel. However, travelers are typically not familiar with local opportunities. They, therefore, are not able to access those same services that they might if they were still in their usual place of business or residence.

Heretofore, providers of information services have attempted to market their goods and services to consumers and travelers on a service specific basis. For example, commercial database and telemarketers have developed the "1-800" and "1-900" telephone services to facilitate access to a single database of a single organization. Likewise, financial institutions have developed automatic teller machines ("ATMs") to offer consumers instant access to their checking, savings and money market accounts. Each of these industries, however, face significant disadvantages with the particular approach that they have selected. Furthermore, none of the three industries has developed a system that is able to offer all three services simultaneously, nor are they able to provide their services directly to many travelers.

Commercial databases or any information service which bills consumers depending upon how long the consumer accesses the database are limited by several features. First, these databases are typically national in scope and provide access via a toll free "1-800" telephone number. This marketing approach precludes many consumers from knowing of this service without the service implementing a complimentary advertising campaign. This disadvantage is compounded for travelers who may not even be aware of the appropriate advertising channel to refer to ascertain database access information. Second, "1-800" numbers impose a financial burden on the operators of the database in many circumstances. In particular, when a consumer accesses the database, a telephone line is occupied regardless of whether the consumer ultimately pays for the service. In many cases, the consumer will dial the "1-800" number out of curiosity and will hang-up when prompted to provide a means for paying for the database. This access costs the database provider yet generates no revenue. Moreover, such services cannot provide immediate local services often required by travelers such as hotel guests.

Telemarketing services suffer from the same disadvantages as database operators. Also, telemarketers who provide food and other time sensitive commodities suffer the disadvantage of not being able to target a consumer by his location in many instances. For example, it would be advantageous if a food delivery service was able to target only those consumers that were within the geographical service area of the food delivery service. Such geographically localized services are particularly ill suited for the "1-800" service presently marketed by long distance telephone companies. Their local market area may not generate enough revenue to support a national "1-800" number, nor can such services provide adequate timely services in various local areas.

ATMs provide excellent service to banking customers in particular circumstances. Unfortunately, ATMs are expensive machines which must be located in areas frequented by customers so that the ATMs may be cost effective. ATMS are frequently limited by the financial institutions that they represent and therefore whose accounts they provide access to. Furthermore, travelers frequently are unaware of the location of ATMs, even should their financial institution be represented by a particular machine. Many institutions, such as hotels, do not have ATM installations, thus requiring their guests to travel to remote locations to obtain cash.

Therefore, a need has arisen for telecommunications information system which is adaptable to provide to consumers access to information databases, telemarketing services, and electronic funds transfer services. The telecommunications information system should be inexpensive, resource efficient and accessible to consumers, especially travelers.

SUMMARY OF THE INVENTION

In accordance with the present invention, a cash access system is provided which substantially eliminates or reduces disadvantages and problems associated with prior cash access systems.

A cash access system is provided for disbursing funds to consumers, such as the guest of a hotel, according to instructions of the consumer. The system comprises circuitry for receiving instructions associated with the request from a selected one of a plurality of input terminals, for validating the request with the relevant authority, for instructing the management associated with the input terminals to disburse the funds to the consumer and for billing the consumer for the withdrawal.

The first technical advantage of the system is that it uses, in large part, pre-existing equipment. As a result, the system is very inexpensive to install and can be placed in countless locations worldwide with little additional cost. Also the system requires no security or maintenance beyond what already exists for the phone system.

A second technical advantage of the system is its availability. The system and hotel cashier are available 24 hours a day, thus allowing a consumer 24 hour access to his money.

A final technical advantage of the system is its flexibility. The system may be programmed to bill the patron for his cash advance in several ways. The owner of the system is also allowed to charge reasonable fees for the use of the system.

BRIEF DESCRIPTION OF THE DRAWINGS

A more complete understanding of the present invention may be derived by referring to the detailed description and claims when considered in connection with the accompanying drawings, in which like reference numbers indicate like features through the drawings, and wherein:

FIG. 2 is a block diagram of the call processing system depicted in FIG. 1;

FIG. 4 is an overall flow chart showing the process of accessing multiple phone services in a hotel environment; and FIGS. 5a and 5b, collectively, depict one embodiment of steps necessary to implement an online subroutine.

FIG. 6 depicts one embodiment of steps necessary to implement a caller delivery service subroutine.

FIGS. 7a and 7b, collectively, depict one embodiment of steps necessary to implement a special service subroutine.

DETAILED DESCRIPTION OF THE INVENTION

Figure 1:
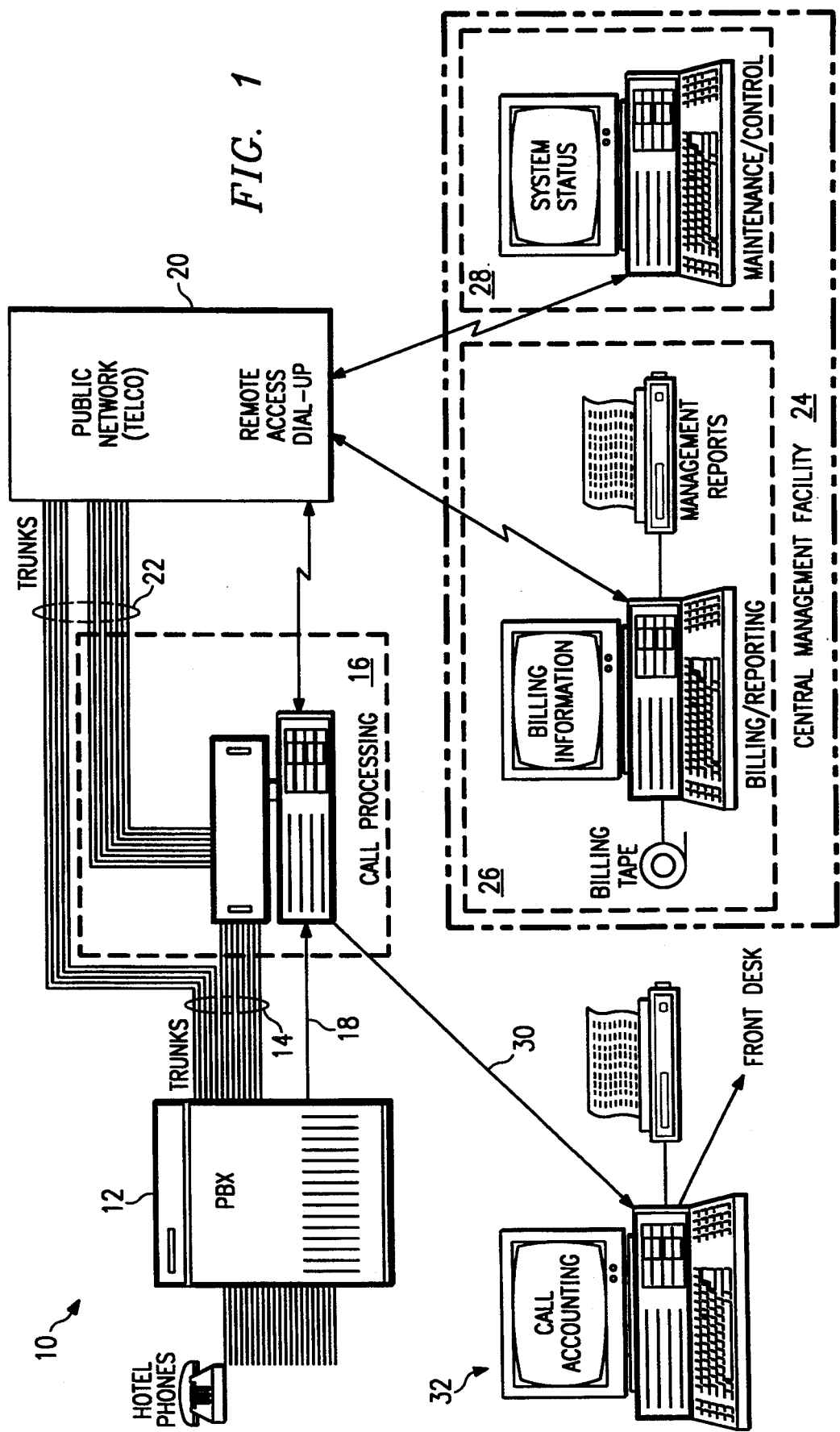
FIG. 1 is a block diagram of a telecommunications information system incorporating the disclosed invention for use in a hotel environment.

Referring to FIG. 1, an integrated telecommunications system 10 is illustrated for installation in a location such as a hotel. The disclosed invention, however, is suitable for installation in a range of environments serviced by a PBX system. It should be understood, therefore, that while the specific example of a hotel is used, the scope of the invention should not be construed to be limited to a hotel environment.

A system indicated generally at 10 comprises a PBX system 12 which services a plurality of input terminals. Here, each input terminal is a PBX branch located in a particular hotel room, or the voice terminal of the present invention as will be subsequently described with respect to FIG. 3. PBX 12 is coupled through trunk lines 14 to a call processing system 16. Not all trunk lines need be routed through call processing system 16. Call processing system 16 can perform several functions including those required by the present invention. Call processing system 16 has digital voice recording and playback, billing, and remote call-out capability as will be more fully described below. Call processing system 16 may have voice recognition capability and may receive station message detail recording system ("SMDR") data from PBX system 12 through a data line 18. In some configurations, it may not be cost efficient to provide PBX 12. In such a case, as where there are few branches, system 16 may be tied directly to each telephone or input terminal served.

Call processing system 16 is coupled to a public network or central office ("CO") 20 through trunks 22. Call processing system 16 may also be remotely coupled to a central management facility 24 through CO 20. Central management facility 24 may comprise, for example, a billing reporting system 26 and a maintenance/control system 28.

Call processing system 16 is coupled through an output line 30 to a call accounting system 32. According to one embodiment of the present invention, PBX 12, call processing system 16 and call accounting system 32 are located on the same premises. Call accounting system 32 performs several functions. Call accounting system 32 may have the capability to rate and bill for calls, may receive information on rated calls and apply them to a correct account and may perform billing operations of the present invention described more fully below. The call accounting system 32 may also relay instructions to hotel employees. The purpose of these instructions will become apparent below. The call processing system 16 of the present invention is capable of performing billing operations itself. Accordingly, the hotel call accounting system 32 may be eliminated in one embodiment of the present invention by appropriately formatting the records to be output so that they can be sent directly to the hotel front desk printer. The description of the invention herein with reference to the call accounting system 32 should not be construed to limit the scope of the present invention to any particular method of presentation of the records generated and output by the system of the present invention.

Call processing system 16 has the ability to accurately time the duration of telephone calls placed by the processing system 16. Processing system 16 then collates the time with data captured by PBX 12 to create a complete billing record. This is accomplished through the use of methods and technology described fully in U.S. Pat. No. 5,048,079 issued Sept. 10, 1991 to Harrington, et al., for a "SMDR Translator."

Central management facility 24 provides billing and control functions to telecommunications information system 10. Billing/recording system 26 may process billing records appropriate to the telecommunications services accessed through system 10 for collection by the owner of PBX 12 or for resale to a collection agency. Maintenance/control system 28 may be used to monitor the status of system 10 and to periodically reprogram call processing system 16. It should be understood that the functions attributed to billing and recording system 26 and maintenance/control system 28 may be incorporated completely or in part into call accounting system 32 where they may be performed more readily by personnel located within the environment housing PBX 12 and call processing system 16.

FIG. 2 is a block diagram of the call processing system 16 depicted in FIG. 1. Call processing system 16 may comprise, for example, a suitable personal computer 34 such as an IBM AT compatible system with an Intel 386 SX microprocessor. The call processing software may be operated as a single task in a multi-task environment under a supervisory routine according to known methods. Such an environment allows call processing system 16 to accomplish other objectives not related to the disclosed invention such as billing and rating long distance telephone calls. Computer 34 itself comprises at least one speech board 36 and an input/output board 38 such as an AST four port serial board.

Computer 34 is connected through I/O board 38 and line 30 to call accounting system 32. Computer 34 is also connected to PBX 12 and controller 40 through lines 18 and 42 respectively. Controller 40 comprises a dedicated microprocessor, ROM, RAM, and I/O. Controller 40 controls a series of peripherals 44 and 46 through a backplane connector 48. Trunks 14 are routed to peripherals 46 through backplane connector 48. Power supply 50 provides power to controller 40 and peripherals 44 and 46.

Peripheral 46 may comprise a line interface peripheral ("LIP") which controls a single trunk line 14 according to known methods. Alternatively, LIP 46 may comprise a two line interface peripheral ("TULIP"). The LIP is responsible for interfacing the CO to the PBX unit 12, peripheral 44, and controller 40.

Peripheral 44 is a system interface peripheral ("SIP") which provides common functions to each LIP or TULIP. SIP 44, for instance, provides a bong tone, dial tone and other special information tones ("SIT").

According to one embodiment of the present invention controller 40 may comprise a Gespak 68000 controller board and speech board 36 may comprise a Dialogic D4X board. Also, call processing system 16 has twelve LIPs or TULIPs which provide trunk switching capacity of twelve and twenty-four lines respectively.

In operation, computer 34 runs software that implements the subroutines described below and contains speech data typically on a hard disk. The Dialogic D4X boards 36 generate speech for controller 40 as directed by computer 34. Each D4X board is able to generate four voice channels, for a maximum of 8 system voice channels. In this way, call processing system 16 may verbally give instructions to a user connected to PBX 12 (depicted in FIG. 1) and may connect the user to any other telephone number through trunk lines 22.

Figure 3:
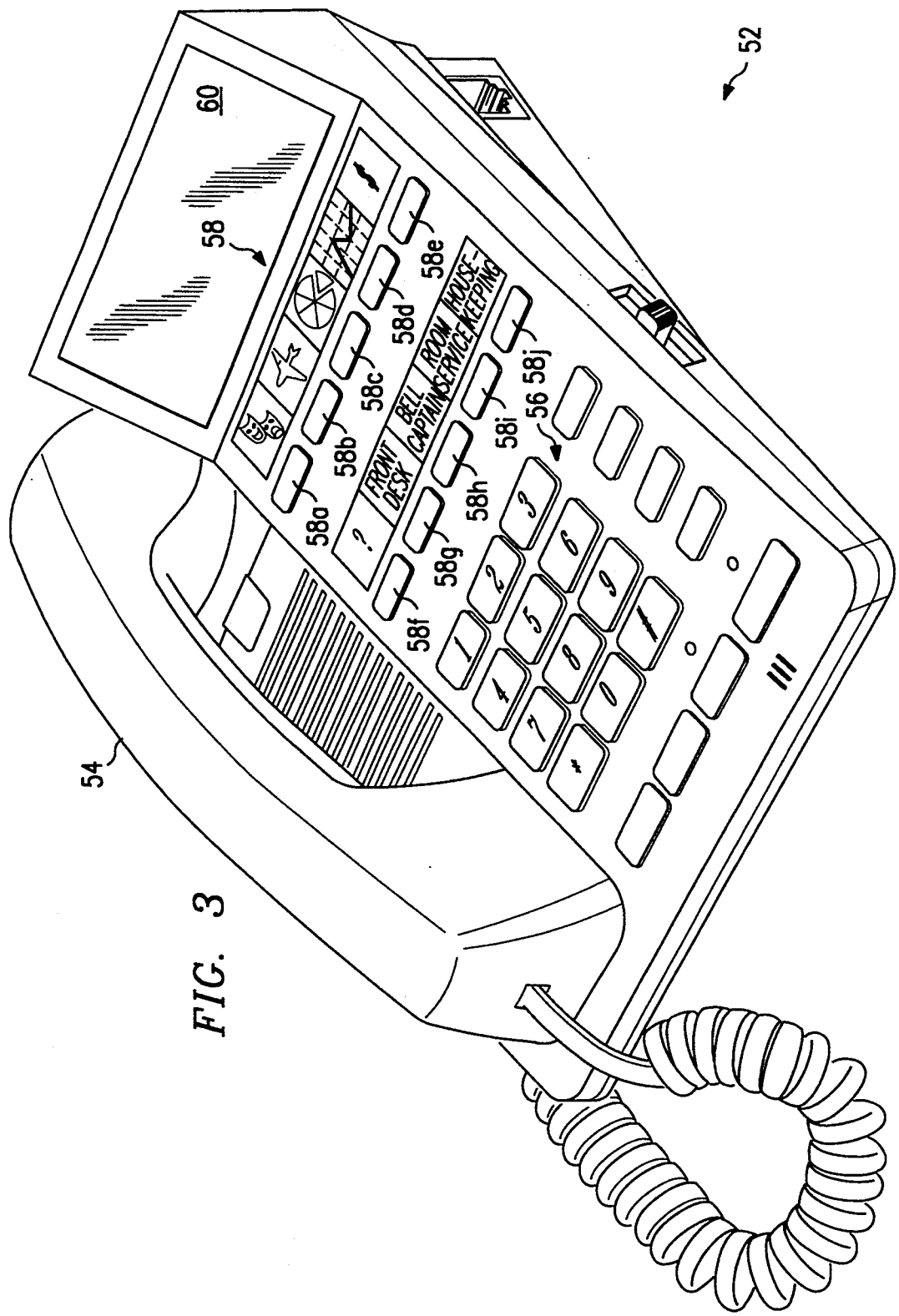
FIG. 3 is a perspective illustration of a voice terminal for use with the system depicted in FIG. 1.

FIG. 3 is a perspective illustration of a voice terminal 52 for use with the system depicted in FIG. 1. In the preferred embodiment, voice terminal 52 may be located in a hotel room and comprises a standard handset 54 and a 12-key touchpad 56. In addition, voice terminal 52 comprises a series of programmable buttons 58. Programmable buttons 58 are incorporated into voice terminal 52 to provide convenient access to the information services described herein. Alternatively, touch pad 56 may be used in conjunction with voice prompts through handset 54 to guide the user through each of the possible telecommunication information services. Conventional dual tone multifrequency ("DTMF") signals may be used to relay instructions from the user to system 16.

As depicted, voice terminal 52 may include descriptive icons or short explanations of each programmable button 58a–j to aid the user and to encourage use of the offered information services. Voice terminal 52 may also include a more lengthy set of instructions which may be placed on holder 60 or elsewhere. In one embodiment, buttons 58a–j are divided into two broad categories: information services and hotel services.

In the illustrated example, buttons 58a–e are dedicated to information services. Specifically, button 58a connects the patron of the system to an entertainment ticket service, button 58b connects the patron to a travel agent, button 58c connects the patron to a food delivery service such as a pizza restaurant, button 58d connects the patron to a stock quotation service, and button 58e connects the patron to a cash access system.

Buttons 58f through 58j connect a patron of the system with various branches of PBX 12 (FIG. 1). In the illustrated example, button 58f connects the patron to a general information desk while buttons 58g through 58j connect the patron to the hotel front desk, bell captain, and room service and housekeeping departments respectively.

The function of buttons 58a–j may change depending on the time and the particular location of voice terminal 52. Call processing system 16 (FIGS. 1 and 2) may contain software code to interpret standard signals sent from voice terminal 52 differently depending upon the time the signal is received or depending upon which PBX branch originates the command. Alternatively, voice terminal 52 may contain circuitry to modify the signals it outputs to call processing system 16 depending upon the same variables. In this way, a patron may be connected, for instance, to room service when button 58i is depressed during normal business hours and to an outside vendor when room service is unavailable late at night. Also, a patron may be connected to premium hotel services or information services if the patron rents a premium room such as a suite.

In operation, a consumer may use voice terminal 52 conventionally as a telephone receiver or may access any number of hotel or information services by pressing one of programmable buttons 58. When the user depresses one of programmable buttons 58, PBX 12 (depicted in FIG. 1) will switch the consumer to one of the trunks 14 entering call processing system 16. PBX 12 may send a code to system 16 to alert system 16 of the desired service. Call processing 16 may then implement software routines to perform functions necessary to complete the requested service. However, if the consumer uses the phone in a conventional way, PBX 12 will route a call through a trunk line 14 which directly connects with public network 20 (depicted in FIG. 1). In certain configurations, call processing system 16 may handle long distance calls from PBX 12 through known methods.

The hardware depicted in FIGS. 1 through 3 is designed to offer information services to consumers. These information services may be loosely classified into three categories for purposes of discussion: 1) online services, 2) call-delivery services, and 3) special services. In an online service, a customer is connected to a database such as a stock quote or daily horoscope service which charges the consumer a fee depending upon the duration of the call. The hotel can charge the consumer a flat fee or a percentage of the call and bill the fee to the user's hotel room or bank card. Call-delivery services involve the customer conversing with another human or system to purchase some good or service. In this scenario, call processing 16 does not bill the patron. Rather, it delivers a call from the patron to the requested service and generally bills the provider of the good or service for the referral. System 16 may charge the user a small fee to cover the cost of the call. Any number of services could be offered in this format. Food delivery services, however, are particularly well suited to such a system. Special services are those that involve interaction with hotel personnel or with other equipment and systems. For instance, a cash advance may be requested from the hotel cashier through a cash access system or theater tickets might be ordered to be printed by a hotel printer.

The classification scheme discussed above, however, is not intended to limit the scope or type of services that the disclosed invention may provide. It is merely intended for purposes of explanation. For instance, the ticket service discussed above may be either a call-delivery service or a special service depending upon the owner's preference. In the first case, the user would be referred to a ticket agent and the ticket agent would be billed for the referral by the system owner. In the second case, the user would arrange to pay for the tickets through, e.g., a bank card and would either have the tickets delivered to him or pick them up himself.

Call processing system 16 may bill the hotel guest for information services in a number of ways. The hotel guest may charge a fee to his room account, to a bank card, or to a calling card account. Similarly, the owner of call processing system 16 may collect his fees in a number of ways. System 16 may, for example, instruct the hotel to collect for the transaction through call accounting system 32 or may store the billing information internally. If stored internally, call processing system 16 would periodically disgorge its information through the central office 20 to the billing recording system 26 of central management facility 24. The billing recording system 26 could then create an account receivable for later sale to a collection agency. When billed, call processing system 16 would necessarily include a hotel fee in its billing data to financially support call processing system 16, call accounting system 32, and central management facility 24.

FIGS. 4 through 7b disclose one set of possible software implementations of the present invention.

FIG. 4 depicts a program run on PBX 12 (FIG. 1) to integrate the functions of the disclosed invention with the functions of a PBX. The PBX program 62 is initialized at block 64 when a guest picks up the handset of a phone and presses any button. PBX program 62 then determines what service is desired by the hotel guest in decision blocks 66, 68, and 70. These blocks determine, in no particular order, whether the hotel guest desires to place an outside telephone call by accessing the public network (block 72), place a telephone call within the PBX-served environment (block 74), or whether the guest desires a special hotel service block 76. Depending upon the hotel guest's input, PBX program 62 implements the corresponding PBX subroutine, indicated by blocks 72, 74 and 76. Subroutines 72, 74, and 76 may be accessed by the hotel guest by pressing certain keys on the guest's telephone. Typically, the public network is accessed by dialing "9" or "8", for local and long distance calls respectively. Branch-to-branch calls, block 72, may be made by dialing any other number other than "9" or "8". Hotel services subroutine 76, may be accessed by dialing either the "#" or "*" keys or by depressing dedicated keys on the guest telephone. PBX 12, can then handle the call itself, pass the hotel service request to call processing 16, or pass the outside call to CO 20 (depicted in FIG. 1). The particular hotel service desired may be determined by which dedicated key is depressed or what follows the "#" or "*" key. After running subroutines 72, 74, or 76 or after not receiving a valid PBX instruction, PBX program 64 terminates, block 78.

Figure 5B:
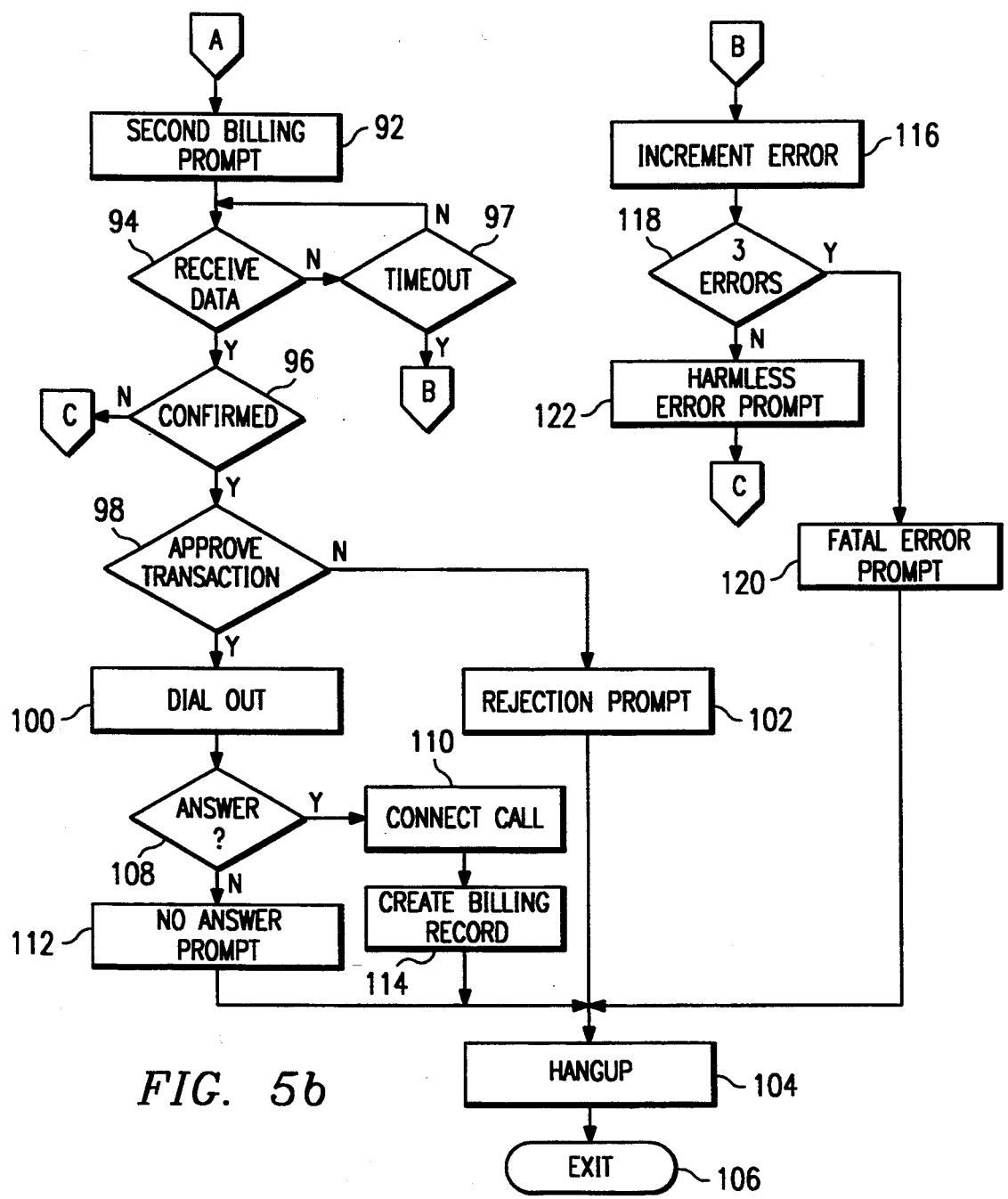

FIGS. 5a and 5b depict one embodiment of steps necessary to implement an online subroutine 80 such as accessing a stock quote database. Online subroutine 80 is entered into (block 82) whereupon subroutine 80 confirms the service selection by the guest, block 84: "Welcome to Intelli*Guest's Stock Update line. To exit, hang up." Next, the guest is informed of the cost of the service and of the possible ways in which he may pay, block 86: "You will be charged fifty cents per minute once you are connected. This may be charged to your room or billed to a major credit card. You may use American Express, MasterCard, Visa, or Discover credit cards. To charge your room, press 1. To charge a credit card, press 2. To exit, hang up." The guest then inputs his method of payment selection, block 88. If the guest fails to timely enter a response to block 88, subroutine 80 will recognize this failure, block 90. If uncorrected, subroutine 80 branches into a series of error steps indicated by the letter B.

Continuing at FIG. 5b, subroutine 80 then requests the patron's credit card number if the guest so chooses to pay for the service with a credit card, block 92: "Please enter your credit card number and the expiration date of your card." The guest then inputs the data, block 94. Call processing system 16 confirms the credit card data, block 96. Block 96 contains the prompt: "Your card number is (digits) and expires on (date). If correct, press 1. If not, press 2." Again, if the guest fails to timely enter a response, subroutine 80 will recognize the failure, (block 98) and will branch if uncorrected to a series of error steps indicated by the letter B.

The guest's billing preference is then validated and if approved, call processing system 16 (FIGS. 1 and 2) dials out to the requested online service, blocks 98 and 100 respectively. Conversely, if the billing preference of the guest is not approved, call processing system 16 will play a rejection prompt to the guest (block 102) notifying the guest of the result: "I'm sorry, we are unable to process your credit card at this time." Subroutine 80 will then hang up and exit the subroutine, blocks 104 and 106. If call processing system 16 dials out, subroutine 80 will attempt to detect an answer by the online service block 108. If successful, call processing system 16 will connect the online service and the patron and after a short pause will create a billing record of the call, blocks 108, 110 and 114. If no answer is detected, then call processing system 16 will inform the patron of the fact, block 112: "I'm sorry, but the call cannot be completed at this time." At the end of the call or after no answer is detected, call processing system will exit the system, blocks 104 and 106.

Letter B indicates a set of generalized error steps in which an error register is incremented (block 116) after each user error. If a preset number of errors is exceeded, such as 3, then a fatal error prompt is played to the user, and the system subroutine exits, blocks 118 and 120. If the threshold has not been exceeded, a harmless error prompt is instead played to the guest, (block 122) and he is allowed to reenter the subroutine at letter C. It should be understood that although only one reentry point is indicated, multiple enter points could be added to avoid forcing the user and subroutine 80 to repeat successful steps.

A user has several billing options in subroutine 80 including charging the service fee to an account such as his hotel room bill, charging a calling card account or charging a bank card account. In the case of the later two, a known validation service such as VICS may be used. U.S. Pat. No. 4,890,317 "Automatic Validation of Telephone Account Numbers" to Hird et al. issued Dec. 26, 1989 discloses such a validation service and is incorporated herein by reference.

FIG. 6 depicts a subroutine 124 operable to implement a call delivery service such as a call to a pizza restaurant for food delivery to the guest. Call delivery service 124 is entered in block 126. The patron is first prompted to request a particular call delivery service, block 128: "Hello. Welcome to Intelli*Guest's dining line. For the cost of a local call, we'll connect you with your choice of nearby restaurants that deliver 24 hours a day. For Chinese food, press 1. For pizza and Italian food, press 2. For hamburgers or breakfast items, press 3." Subroutine 124 then accepts input (block 130) and determines the telephone number corresponding to the requested call, block 132. Call processing system 16 then dials out, (block 134) and waits for an answer, block 136. When an answer is received, call processing system 16 plays a prompt to the outside vendor indicating the source of the call, block 138: "This is an Intelli*Guest customer transfer. One moment while you are connected." Information relating to the call may be transferred to the vendor via DTMF signals, if desired. Call processing system 16 then connects the patron to the desired service, block 140. If no answer is received from the third party vendor, then the call processing system plays an appropriate prompt to the guest, block 142: "I'm sorry, but the call cannot be completed at this time." Call processing system 16 then creates a billing record (block 144) which reflects the number of calls delivered to each particular call-delivery vendor. Subroutine 124 then hangs up after a complete call and exits the system, blocks 146 and 148 respectively. Blocks 98 and 116 through 120 create a generalized error routine as described in connection with FIG. 5b.

Blocks 128 through 132 may be removed from subroutine 124 in the case when dedicated buttons are provided to the user. Such a case is depicted in FIG. 3. There, the callout number is uniquely determined prior to block 126.

Figure 7B:
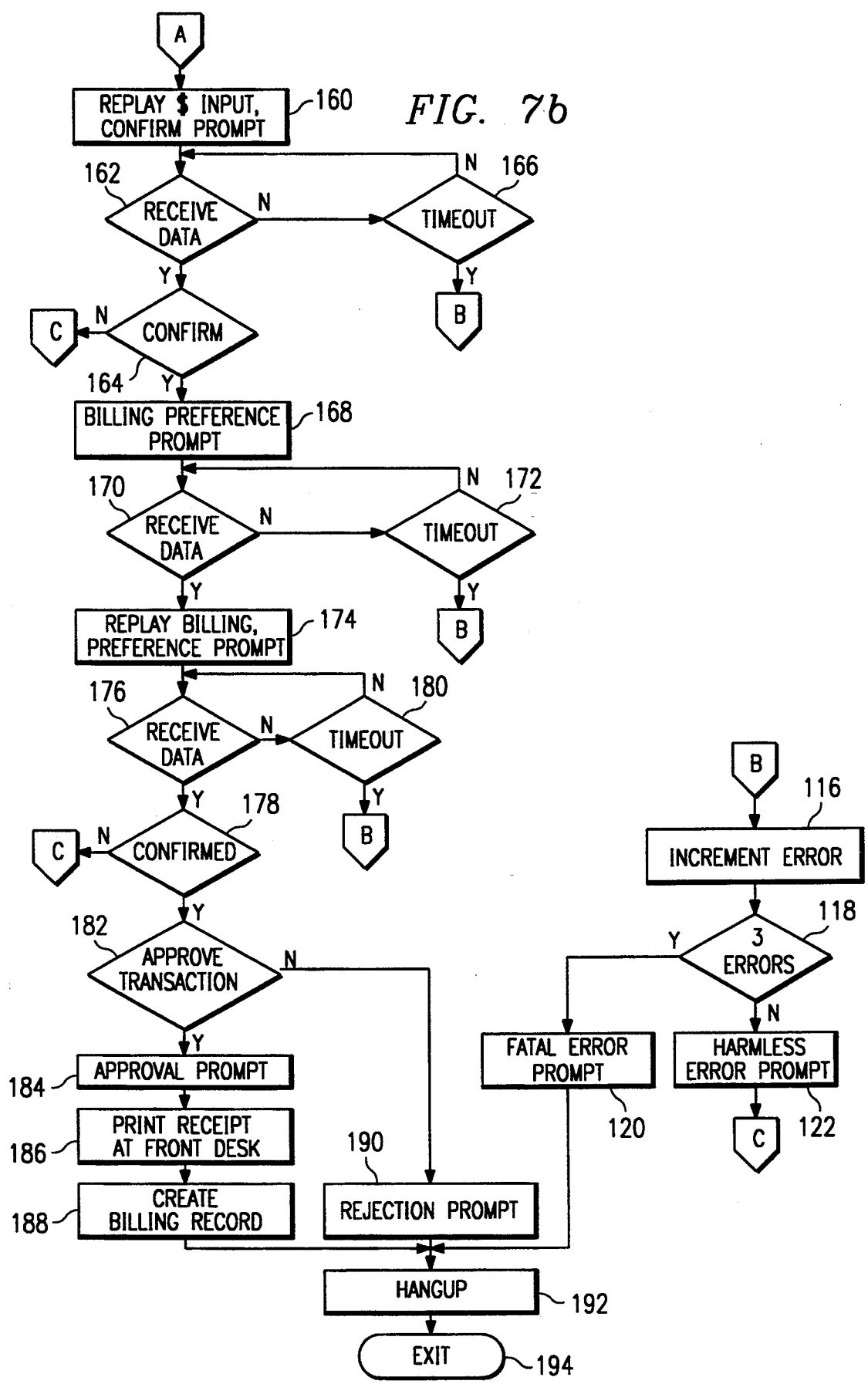

FIGS. 7a and 7b depict one embodiment of steps necessary to implement special service subroutine 150. In the particular illustration, subroutine 150 is a cash withdrawal service. Special services subroutine 150 is entered into (block 152) whereupon subroutine 150 welcomes the guest to the service and informs him of the payments options, block 154: "Welcome to Intelli*-Guest's Cash Advance line. You may obtain cash advances using American Express, MasterCard, Visa, or Discover." Subroutine 150 prompts the hotel guest for the guest's withdrawal request, block 156: "Cash is available in amounts of $25, $50, $100, and $250 for fees of $3, $5, $9, and $13 respectively. For $25 plus a fee of $3, Press 1. For $50 plus a fee of $5, Press 2. For $100 plus a fee of $9, Press 3. For $250 plus a fee of $13, Press 4. If you would like this list repeated, Press 5." If the guest fails to timely enter a response, subroutine 150 recognizes this failure, blocks 158 and 159. If uncorrected, subroutine 150 branches to a series of error steps indicated by the letter B (FIG. 7b).

In FIG. 7b, subroutine 150 continues at letter "A". Subroutine 150 replays the data input by the hotel guest at block 160: "You have requested (amount) plus a fee of (fee). If this is correct, Press 1. If not correct, Press 2." Subroutine 150 allows the guest to confirm the data, blocks 162 and 164. If the guest fails to timely enter data, subroutine 150 branches to a set of error steps indicated by the letter "B" through block 166. Also, if the hotel guest indicates an error with his input data, subroutine 150 returns to the beginning of the subroutine at letter C.

Subroutine 150 then prompts the guest for the account number and expiration date of the credit card the patron wishes to charge his cash advance against, block 168: "You may use your American Express, MasterCard, Visa, or Discover credit card. Please enter your credit card number and the expiration date of your card." This data is input, block 170. If the guest fails to timely enter data, subroutine 150 branches to a set of error steps indicated by the letter B through block 172. The guest's credit card data is replayed to him, block 174: "Your card number is (audio digits) and expires on (date). If correct, Press 1. If not correct, Press 2." The guest may then confirm the stored data, blocks 176 and 178. If the guest fails to timely enter data, subroutine 150 branches to a set of error steps indicated by the letter B through block 180. Also, if the hotel guest indicates an error with his input data, subroutine 150 returns to the beginning of the subroutine at letter C.

Subroutine 150 seeks approval of the transaction (block 180) again through known methods such as VICS. If approved, subroutine 150 informs the hotel guest of the approval, block 184: "Thank you for using the Intelli*Guest Cash Line. Your cash will be ready at the Front Desk in a few minutes." Subroutine 150 also prints a receipt with instructions for the hotel cashier and creates a billing record according to the guests indicated preference at blocks 186 and 188, respectively. Call processing system 16 may also instruct the guest at this point to see the hotel staff at the front desk to receive his requested funds or may direct the hotel staff to deliver the money to the guest's room. Conversely, if the sponsor of the credit card rejects the guest's request, then subroutine 150 informs the guest of the fact, block 190: "I am sorry but we are unable to accept your card at this time." In either situation, subroutine 150 then disconnects the link between it and the hotel patron (block 192) and exits subroutine, block 194.

Arrow B indicates a set of generalized error steps 116 through 122 as described in connection with FIG. 5b.

Subroutine 150 may bill the patron of the system by charging the funds withdrawn plus a fee against the patron's bank card or against the patron's room account. Similarly, subroutine 150 and block 188 may contain data indicating the daily currency exchange rates between two currencies if the guest's bank card is through a foreign bank. In such a case, the guest could request a certain amount of his native currency be exchanged into local currency or could ask directly for a certain amount of local currency. In either case, subroutine 150 could generate revenue by charging a conversion rate slightly more advantageous than that charged by international monetary exchange institutions. Block 156 could be modified to play a prompt to the patron reflecting the exchange rate, and giving the patron a chance to abort the transaction. The billing record may then be sold to a third party for collection at a discount or may be collected by the owner of the PBX itself.

Although the present invention has been described in detail, it should be understood that various changes, substitutions and alterations can be made hereto without departing from the spirit and scope of the invention as defined by the appended claims.

What is claimed is:

1. A telecommunications system used to instruct a cashier to disburse requested funds to a patron of the system, the system comprising:
   a selected input terminal, remotely located from the cashier, for relaying a fund-disbursement request from the patron;
   input circuitry for receiving said request, prompting the patron via said input terminal for information needed to process said request, receiving said information from the patron via said input terminal, and processing said request;
   authorizing circuitry coupled to said input circuitry and responsive to said information for validating said request;
   relaying circuitry coupled to said authorizing circuitry and responsive to said validation for instructing the cashier to disburse the requested funds; and
   accounting circuitry responsive to said input circuitry and said authorizing circuitry for creating a record of said fund-disbursement request, determining a charge for said disbursement, and billing the patron for said charge, said accounting circuitry comprising converting circuitry for converting the amount of requested funds from a first currency into a corresponding amount of a second currency, wherein said accounting circuitry determines said charge for said disbursement in said second currency.

2. The system of claim 1 wherein said converting circuitry converts the amount of said charge into a corresponding amount of said first currency.

3. A telecommunications system used in conjunction with a hotel PBX operable to instruct a cashier to disburse funds to a hotel guest, the system comprising:

a telecommunications station available to the guest operable to generate first signals indicative of a requested cash withdrawal of the guest;

input circuitry for receiving said first signals via a PBX system resident in the hotel;

authorizing circuitry responsive to the input circuitry for contacting an external validation system and receiving second signals from said validation system indicating the validity of an account number entered by the guest;

relaying circuitry responsive to the authorizing circuitry for instructing the cashier of the hotel to disburse said requested cash withdrawal; and accounting circuitry responsive to said input circuitry and to said authorizing circuitry for creating a record of said requested cash withdrawal, formulating a charge for said requested cash withdrawal, and billing said charge separately from said requested cash withdrawal, said accounting circuitry comprising converting circuitry for converting the amount of requested funds from a first currency into a corresponding amount of a second currency, wherein said accounting circuitry determines said charge for said disbursement in said second currency.

4. The system of claim 3 wherein said converting circuitry converts the amount of said charge into a corresponding amount of said first currency.

* * * * *

UNITED STATES PATENT AND TRADEMARK OFFICE
CERTIFICATE OF CORRECTION

PATENT NO. : 5,367,561
DATED : Nov. 22, 1994
INVENTOR(S) : Adler et al.

It is certified that error appears in the above-identified patent and that said Letters Patent is hereby corrected as shown below:

Column 2, line 21, after "for", insert -- a --.

Column 3, line 56, after "billing", insert -- / --.

Column 4, line 23, after "Billing/", delete "recording" and insert -- reporting --.

Column 6, line 68, after "office to the", delete "billing recording" and insert -- billing/reporting --.

Column 7, line 1, after "facility. The", delete "billing recording" and insert -- billing/reporting --.

Column 7, line 39, after "PBX program", delete "64 terminates" and insert -- 62 terminates --.

Column 9, line 20, after "informs him of the ", delete "payments options" and insert -- payment option --.

Column 1, line 49, after "refer to", insert -- to --.

Column 4, line 23, after "Billing/", delete "recording" and insert -- reporting --.

Signed and Sealed this

Ninth Day of January, 1996

Attest:

BRUCE LEHMAN

*Attesting Officer*            *Commissioner of Patents and Trademarks*